(12) United States Patent
Brady et al.

(10) Patent No.: US 6,969,692 B2
(45) Date of Patent: Nov. 29, 2005

(54) PROCESS FOR THE PREPARATION OF DOPED PENTASIL-TYPE ZEOLITES USING A DOPED REACTANT

(75) Inventors: Mike Brady, Studio City, CA (US); Erik Jeroen Laheij, Amstelveen (NL); Paul O'Connor, Hoevelaken (NL); Dennis Stamires, Newport Beach, CA (US)

(73) Assignee: Albemarle Netherlands B.V., Amersfort (NL)

( * ) Notice: Subject to any disclaimer, the term of this patent is extended or adjusted under 35 U.S.C. 154(b) by 235 days.

(21) Appl. No.: 10/647,632

(22) Filed: Aug. 25, 2003

(65) Prior Publication Data

US 2004/0121900 A1 Jun. 24, 2004

Related U.S. Application Data

(60) Provisional application No. 60/406,490, filed on Aug. 28, 2002.

(51) Int. Cl.$^7$ .............................................. B01J 29/06
(52) U.S. Cl. ........................ 502/66; 502/64; 502/71; 502/77; 423/700; 423/710; 423/711
(58) Field of Search .......................... 502/60, 64, 66, 502/71, 77; 423/700, 710, 711

(56) References Cited

U.S. PATENT DOCUMENTS

| | | | |
|---|---|---|---|
| 3,769,386 A | 10/1973 | Rundell et al. ............. 423/263 |
| 4,639,360 A | 1/1987 | Valyocsik .................... 423/329 |
| 4,705,675 A * | 11/1987 | Desmond et al. ........... 423/705 |
| 5,338,525 A | 8/1994 | Joly et al. .................... 423/326 |
| 5,367,100 A | 11/1994 | Gongwei et al. ........... 585/640 |
| 5,558,851 A | 9/1996 | Miller ......................... 423/702 |
| 5,869,021 A | 2/1999 | Wang et al. ................. 423/718 |
| 5,919,430 A | 7/1999 | Hasenzahl ................... 423/702 |
| 6,346,224 B1 | 2/2002 | Vitale-Rojas et al. ....... 423/329 |
| 6,887,457 B2 * | 5/2005 | O'Connor et al. .......... 423/709 |
| 2004/0091420 A1 * | 5/2004 | Rao ............................ 423/709 |
| 2004/0092386 A1 * | 5/2004 | Brady et al. .................. 502/64 |

FOREIGN PATENT DOCUMENTS

| | | | |
|---|---|---|---|
| EP | 0814058 | 12/1997 | ........... C01B 37/00 |
| FR | 2730723 | 8/1996 | ........... C01B 39/06 |
| GB | 2033358 | 5/1980 | ........... C01B 33/28 |
| WO | 92/12096 | 7/1992 | ........... C01B 33/34 |
| WO | 01/12551 | 2/2001 | ............. C01F 7/00 |
| WO | 01/12552 | 2/2001 | ............. C01F 7/02 |
| WO | 01/12554 | 2/2001 | ............. C01F 7/34 |

OTHER PUBLICATIONS

Abstract of Chinese Patent 1,209,356, Aug. 27, 1997.
Abstract of Chinese Patent 1,052,290, Nov. 30, 1989.
Abstract of French Patent 2,730,723, Aug. 23, 1996.
European Search Report of corresponding Patent Application No. 02079431.9, no date.
Ovejero, G. et al: "Bifunctional Properties of Al-TS-1 Synthesized by Wetness Impregnation of Amorphous $Al_2O_3$-$TiO_2$-$SiO_2$ Solids Prepared by the Sol-Gel Method", Catalysis Letters 41 (1996), pp. 69-78, XP002261381.
Giannetto, G, et al, Synthesis and Characterization of [Cr, Al]-ZSM-5 Zeolites, Zeolites, Elsevier Science Publishing, US, vol. 19, No. 2-3, Aug. 9, 1997, pp. 169-174, XP004091572.
International Search Report of corresponding PCT Application No. PCT/EP03/09186, dated Dec. 2, 2003.

* cited by examiner

*Primary Examiner*—Christina Johnson

(57) ABSTRACT

A process for the preparation of a metal-doped pentasil-type zeolite comprising the steps of:
a) preparing an aqueous precursor mixture comprising a silicon source and an aluminum source, at least one of these sources being doped with a rare earth metal or a transition metal of Groups Vb–VIIIb, Ib, or IIb of the Periodic System, and
b) thermally treating the precursor mixture to form a metal-doped pentasil-type zeolite.

With this process, metal-doped pentasil-type zeolites can be prepared while the risk of precipitation of the dopant as a separate phase is minimized.

8 Claims, No Drawings

PROCESS FOR THE PREPARATION OF DOPED PENTASIL-TYPE ZEOLITES USING A DOPED REACTANT

CROSS REFERENCE TO RELATED APPLICATION

This application claims priority from U.S. Patent Application No. 60/406,490, filed Aug. 28, 2002.

BACKGROUND OF THE INVENTION

1. Field of the Invention

The present invention relates to the preparation of metal-doped pentasil-type zeolites using a metal-doped reactant.

2. Prior Art

U.S. Pat. No. 6,346,224 discloses the preparation of metal-doped aluminosilicates with MFI topology by mixing a sodium silicate solution with an acidic metal-containing solution (e.g. an Fe—, Ni—, Zn—, or Cr-containing solution) to form a silicon-metal solution, and mixing this silicon-metal-containing solution with an aluminum-containing solution to provide a gel mixture.

This gel is crystallized under hydrothermal conditions to provide a metallo-aluminosilicate having an aluminosilicate framework with the metal incorporated therein.

As the aluminum-containing mixture is basic and the silicon-metal-containing mixture is acidic, it will be clear that upon addition of the basic aluminum-containing solution to the acidic silicon-metal-containing solution, the metal can precipitate as hydroxide. This has a negative effect on the homogeneity of the metal distribution in the resulting zeolite.

The present invention offers a process for the preparation of metal-doped pentasil-type zeolites where the risk of precipitation of the metal dopant as a separate phase is minimized.

SUMMARY OF THE INVENTION

In one embodiment, the process of the invention comprises the following steps:
a) preparing an aqueous precursor mixture comprising a silicon source and an aluminum source, at least one of these sources being doped with a rare earth metal or a transition metal of Groups Vb-VIIIb, Ib, or IIb of the Periodic System, and
b) thermally treating the precursor mixture to form a metal-doped pentasil-type zeolite.

In this process, the silicon source and/or the aluminum source are metal-doped. This means that the desired metal compound (the dopant) has been incorporated into the silicon and/or the aluminum source before the above process is performed.

Other embodiments of the invention encompass details concerning precursor mixture compositions and process steps, all of which will be hereinafter discussed in detail.

DETAILED DESCRIPTION OF THE INVENTION

Metal-doped silicon and/or aluminum sources can be prepared by, e.g., preparing the silicon and/or the aluminum source in the presence of the desired dopant. This results in a silicon and/or an aluminum source wherein the dopant is homogeneously dispersed. Another way of doping is impregnation or ion-exchange of the silicon and/or the aluminum source with the dopant.

Hence, physical mixtures of a silicon or an aluminum source with the desired metal compound in solution or suspension—as in U.S. Pat. No. 6,346,224—are not metal-doped silicon or aluminum sources according to the above definition. It can easily be imagined that when the metal compound is introduced into an aqueous mixture via the silicon or the aluminum source (i.e.: as a metal-doped silicon or aluminum source), it is not freely present in the mixture and the risk of precipitation of the metal as a separate phase is minimized.

The dopant is a rare earth metal (e.g. Ce, La) or a transition metal of Groups Vb–VIIIb, Ib, or IIb of the Periodic System. Groups Vb through VIIIb are the groups represented by vanadium through nickel; Groups Ib and IIb are represented by Cu and Zn, respectively.

Both rare earth metals and the selected transition metals are frequently present in catalysts for hydrocarbon conversion, purification, or synthesis. For instance, Ce and V are known to improve the capability of FCC catalysts and catalyst additives to remove SOx and/or NOx compounds from regenerator gases, while the presence of V and Zn in FCC catalysts or additives improves the removal of S-compounds from the gasoline and diesel fractions of FCC. In hydroprocessing catalysts Co, Mo, and W are generally applied metals, while the alkylation of hydrocarbons over solid acid catalysts applies noble metals such as Pt and Pd. In hydrocarbon synthesis, e.g. Fischer-Tropsch synthesis, Fe, Co, and Ru are desired metals. Ni and Cu are frequently used for the hydrogenation of hydrocarbons.

Examples of transition metals suitable as dopants in the process of the present invention are Mn, Fe, Cu, Ni, Zn, Mo, C, W, V, Pt, and Pd.

The dopant can be incorporated into the silicon or the aluminum source as, e.g., its oxide, hydroxide, carbonate, hydroxycarbonate, chloride, nitrate, sulfate, or phosphate.

The first step of the process according to the invention involves the preparation of an aqueous precursor mixture comprising a metal-doped silicon source and/or a metal-doped aluminum source.

Suitable aluminum sources include aluminum salts, such as $Al_2(SO_4)_3$, $AlCl_3$, $AlPO_4$, $Al_2(HPO_4)_3$, and $Al(H_2PO_4)_3$, and water-insoluble aluminum compounds, e.g., aluminum trihydrate $(Al(OH)_3)$ such as gibbsite and bauxite ore concentrate (BOC), thermally treated aluminum trihydrate such as flash-calcined aluminum trihydrate, (pseudo)boehmite, aluminum chlorohydrol, aluminum nitrohydrol, Si—Al cogels, and mixtures thereof. Also mixtures of one or more of these aluminum sources can be used.

It will be clear that aluminum salts cannot be doped. Hence, the term "doped aluminum source" inherently refers to a metal-doped water-insoluble aluminum source.

Doped (pseudo)boehmite, for instance, can be prepared by hydrolysis of aluminum alkoxide in the presence of the dopant, hydrolysis and precipitation of aluminum salts in the presence of the dopant, or by aging a slurry of (thermally treated) aluminum trihydrate, amorphous gel alumina, or less crystalline (pseudo)boehmite in the presence of the dopant. For more information concerning the preparation of metal-doped (pseudo)boehmite reference is made to International Patent Application Nos. WO 01/12551, WO 01/12552, and WO 01/12554.

Suitable silicon sources include sodium silicate, sodium meta-silicate, stabilised silica sols, silica gels, polysilicic acid, tetra ethylortho silicate, fumed silicas, precipitated silicas, Si—Al cogels, and mixtures thereof.

Doped silica sol, for instance, can be obtained by preparing a silica sol from water glass and acid (e.g. sulfuric acid), and exchanging the sodium ions with the desired dopant. Alternatively, water glass, acid (e.g. sulfuric acid), and dopant are co-precipitated to form a metal-doped silica sol.

It is also possible to use a metal-doped Si—Al cogel as both the aluminum and the silicon source.

The amount of aluminum and silicon source present in the precursor mixture depends on the desired SAR of the resulting doped pentasil-type zeolite.

Preferably, the precursor mixture comprises a seeding material, such as a seed or template. Suitable seeding materials include faujasite-type seeds (zeolite X or Y), pentasil-type seeds (e.g. ZSM-5 seeds or zeolite beta seeds), amorphous seeds (e.g. amorphous Si—Al cogel), clays (e.g. bentonite, kaolin), milled zeolites with crystallites too small to be detected by X-ray diffraction techniques, and sols or gels containing an organic directing template like tetrapropyl ammonium hydroxide (TPAOH) or tetrapropyl ammonium bromide (TPABr). An example of such a template-containing sol is a Si—Al sol containing 0.1–10 wt % of tetrapropyl ammonium bromide.

If desired, a doped seeding material is used. Suitable dopants for seeding materials are the dopants listed above as suitable for the doped aluminum source and/or the doped silicon source.

The optional dopant(s) present in the seeding material and/or the template and the dopant in the metal-doped aluminum source and/or the metal-doped silicon source may be the same or different.

Preferably, the precursor mixture comprises 1–10 wt % of seeding material, based on the total solids content. It is also possible to use more than one type of seeding material.

If so desired, several other compounds may be added to the precursor mixture, such as metal (hydr)oxides, sols, gels, pore regulating agents (sugars, surfactants), clays, metal salts, acids, bases, etc.

Furthermore, it is possible to mill the precursor mixture.

The precursor mixture can be shaped to form shaped bodies. Suitable shaping methods include spray-drying, pelletizing, extrusion (optionally combined with kneading), beading, or any other conventional shaping method used in the catalyst and absorbent fields or combinations thereof. The amount of liquid present in the precursor mixture should be adapted to the specific shaping step to be conducted. It might be advisable to partially remove the liquid used in the precursor mixture and/or add an additional or another liquid, and/or to change the pH of the precursor mixture to make the mixture gellable and thus suitable for shaping. Additives commonly used in the different shaping methods, e.g. extrusion additives, may be added to the precursor mixture used for shaping.

The second step of the process involves thermal treatment of the precursor mixture. This thermal treatment is preferably performed at temperatures ranging from 130 to 200° C., preferably 150–180° C., for 3–60 hrs. During this step, the metal-doped pentasil-zeolite is formed by crystallization.

The thermal treatment can be conducted in one or a series of at least two reaction vessels. If more than one such vessel is used, the process is preferably conducted in a continuous mode. Using more than one reaction vessel further allows the preparation of the aqueous precursor mixture either by adding all ingredients to the first vessel or by spreading the addition of (part of the total amount of) the ingredients over the reaction vessels.

The metal-doped pentasil-type zeolite resulting from the process according to the invention preferably has a $SiO_2/Al_2O_3$ ratio of 25–90. Typical examples of pentasil-type zeolites are ZSM-type zeolites, such as ZSM-5, ZSM-11, ZSM-12, ZSM-22, ZSM-23, ZSM-35, zeolite beta, or zeolite boron beta. The metal-doped pentasil-type zeolite preferably contains 0.1–10 wt % of dopant, more preferably 0.1–3 wt %, and most preferably 0.5–2.5 wt %, calculated as oxide and based on the dry weight of metal-doped pentasil-type zeolite.

If so desired, the resulting metal-doped pentasil-type zeolite may be calcined and optionally ion-exchanged.

The so-formed metal-doped pentasil-type zeolite can be used in or as a catalyst composition or catalyst additive composition for, e.g. hydrogenation, dehydrogenation, catalytic cracking (FCC), alkylation reactions, hydro-desulfurisation, hydrodenitrogenation, and hydrodemetallisation.

EXAMPLES

Example 1

A silica-alumina gel (338.5 g) doped with 5 wt % RE, calculated as oxide, was added to a 30-litre stirred vessel containing 2,666 g water. Next, 2,015 g of a 98 wt % $H_2SO_4$ solution was added, followed by the slow addition (in 15 minutes) of 2,069 g of water glass. Next, 488.9 g of seeds slurry (prepared by mixing 51.9 gram ZSM-5 ex-AlsiPenta with 437 gram water) were added. The pH of the resulting slurry was adjusted with caustic to 10.5.

The temperature of the resulting slurry was raised to 99° C. in one hour and maintained thus for another hour. The temperature was then raised to 170° C. and maintained thus for 12 hours. The resulting product was dried overnight at 120° C.

The powder X-ray diffraction pattern of the product indicated the formation of ZSM-5 without any traces of separate REO peaks. Hence, the rare earth metal was not precipitated as a separate phase.

Chemical analysis showed that the concentration of RE (calculated as oxide) in the ZSM-5 was 0.9 wt %.

Example 2

Example 1 was repeated, except for the addition of caustic to adjust the pH.

Again, powder X-ray diffraction indicated the formation of ZSM-5 without any traces of separate REO peaks. Chemical analysis showed that the concentration of RE (calculated as oxide) in the ZSM-5 was 0.9 wt %.

What is claimed is:

1. A process for the preparation of a metal-doped pentasil-type zeolite, which process comprises the steps of:
   a) preparing an aqueous precursor mixture comprising a silicon source and an aluminum source, at least one of these sources being doped with a rare earth metal or a transition metal of Groups Vb–VIIIb, Ib, or IIb of the Periodic System, and
   b) thermally treating the precursor mixture to form a metal-doped pentasil-type zeolite.

2. The process of claim 1 wherein the doped pentasil-type zeolite is doped ZSM-5.

3. The process of claim 1 wherein a metal-doped silicon source is used.

4. The process of claim 3 wherein the metal-doped silicon source is selected from the group consisting of metal-doped sodium (meta)silicate or water glass, metal-doped stabilised silica sols, metal-doped silica gels, metal-doped polysilicic acid, metal-doped tetra ethylortho silicate, metal-doped fumed silicas, metal-doped precipitated silicas, and mixtures thereof.

5. The process of claim 1 wherein a metal-doped aluminum source is used.

6. The process of claim 5 wherein the aluminum source is selected from the group consisting of metal-doped aluminum trihydrate ($Al(OH)_3$), metal-doped thermally treated aluminum trihydrate, metal-doped (pseudo)boehmite, metal-doped aluminum chlorohydrol, metal-doped aluminum nitrohydrol, and mixtures thereof.

7. The process of claim 1 wherein the aluminum source and/or the silicon source is doped with a metal selected from the group consisting of Ce, La, Mn, Fe, Cu, Ni, Zn, Mo, W, V, Pt, and Pd.

8. The process of claim 1 wherein a shaping step is performed between steps a) and b).

* * * * *